United States Patent Office 3,476,568
Patented Nov. 4, 1969

3,476,568
STORAGE OF SEEDS TO PRODUCE A CEREAL PRODUCT FREE OF FRAG COUNT AND TOXIC RESIDUE
August Louis de Lisle, Scottsdale, Ariz., assignor, by mesne assignments, to Phoenix Gems, Inc., Phoenix, Ariz., a corporation of Arizona
No Drawing. Continuation of application Ser. No. 323,890, Nov. 15, 1963, which is a continuation-in-part of application Ser. No. 803,824, Apr. 3, 1959. This application Apr. 27, 1966, Ser. No. 551,829
Int. Cl. A21d 2/02, 6/00
U.S. Cl. 99—93      8 Claims

ABSTRACT OF THE DISCLOSURE

The method of freeing seeds from insects and insect eggs during storage, which includes the step of coating substantially the entire outer surfaces of the seeds with diatomaceous earth having a diatomite fraction in an amount sufficient to kill adult insects present on the seeds and to kill newly hatched larvae. Also, the further step of storing the seeds at a temperature above that required to hatch the insect eggs on the seeds, for a period of time to hatch all of said insect eggs.

---

This is a continuation of application Ser. No. 323,890, filed Nov. 15, 1963, which in turn is a continuation in part of my prior filed copending application Ser. No. 803,824, filed Apr. 3, 1959, both now abandoned.

This invention relates to improvements in the storage of seed products such as edible grain. The invention also relates to the production of improved cereal foods which are substantially entirely free of insect fragmentation count and poisonous residues, resulting from prior use of insecticides, fumigants and the like.

Grains, of which wheat may be considered illustrative, are usually stored in relatively large circular storage silos forming a part of a complex including operating areas of various kinds for personnel together with equipment for filling the silos, or transferring the grain from one silo to another as required during the storage cycle. Since it is common to raise the grain to the top of the storage silo and drop it by gravity into the interior of the silo, storage complexes of the type referred to are often called elevators. There is also a considerable amount of grain stored in relatively large rectangular windowless buildings, and this type of storage is usually referred to as "flat" storage. For simplification the word "elevator" will be utilized to identify all such storage areas, unless the context indicates otherwise.

When a grain elevator has been in use for a period of time it will be found that almost all of the cracks and crannies around the complex are loaded with insects in some kind of a dormant state or with eggs, so that even clean grain introduced into an elevator will as a rule become infested quickly if proliferation conditions are right. Practically all harvested grain, however, will be found to contain relatively large numbers of insect eggs, and these eggs will hatch within the grain as soon as a hatching temperature has been reached. It is pretty well agreed that below a temperature of about 50° F. insects do not do well, and therefore storage areas have in the past been selected in which an available temperature below 50° F. existed through a large part of the year. It is common therefore to find grain elevators much more prevalent in such areas as the New England states and the Dakotos, Minnesota and the like than in the southern states.

Even though grain is stored in the fall may require no serious attention until early spring, hot spots can develop in the stored grain for various reasons, so that whether it is a matter of a general rise in temperature, or the development of a hot spot, action to inhibit insect activity eventually becomes necessary. A common practice is to fumigate the grain by means of a highly toxic gas such as ethylene di-bromide, a cyanide, or a gaseous phosphate such as one of the modern fumigants going by the trade name of Phostoxin. When an entire storage area is to be fumigated, it is common to draw the gaseous fumigant through the grain mass by the same general evacuating equipment commonly employed to draw cooling air through the mass during winter months. Each fumigation results in some deposit of toxic matter on the grain, so that there is always a limit to the amount of fumigation which is possible. To avoid over-fumigation, it is not an uncommon practice to place temperature sensing devices in spaced relation throughout the stored grain, with a gas outlet near each such sensing device, so that when the development of a local hot spot is found it is possible to fumigate only the area in which the hot spot occurs.

At times also even edible grains may be sprayed with dilute solutions of toxic insecticides so as not to introduce onto the surface of the grain more residue of toxic material than authorized by the Department of Agriculture. Malathion, for example, is one type of insecticide commonly used for this purpose. Notwithstanding the Department of Agriculture regulations, it is not uncommon to find flour containing 100 parts per million of Malathion residue. When grain is selected for use as seed, it is a common practice to treat such seed grain with a substantial amount of an insecticide, so that such seed grain would be completely unsatisfactory for human or animal consumption. All of the grain set aside for seed however is not used as a rule, so that the residue frequently finds its way back into the edible grain market. Theoretically all of the toxic material must be removed by washing or other suitable treatment, but it is not uncommon for small amounts of seed grain to be mixed with food grains so that the toxic level of the food grain is increased, notwithstanding the exercise of even the greatest of care in fumigation treatments.

Notwithstanding the most vigilant application, there is an average shrinkage of stored grain due to insect damage of at least 1% per month of storage. Also, notwithstanding the fact that government regulations require that flour be entirely free of insect fragments—practical regulations permit a "frag count" of one or two—it will be found in the United States that even the very best of flours will usually have a "frag count" of at least of the order of twenty-five to thirty.

Several factors have complicated the problems of grain storage in recent years, including (1) the fact that modern agricultural and insect control methods have resulted in decimation of the natural enemies of many insects, (2) that the apparent necessary most extensive use of toxic control procedures has introduced significant health hazards, (3) and the fact that carry-over of very large volumes of grain, as in government warehouses, has extended the average storage period and very greatly magnified all of the storage hazards of the past.

Accordingly the principal object of the present invention is the provision of an improved commercially and economically feasible method for storing grain.

Another object is the provision of an improved method for controlling insects in stored grain.

A further object is the provision of an entirely new departure and approach from heretofore known methods for the control of insects in stored grain.

A still further object is the provision of an improved material comprising a diatomaceous earth fraction for controlling insects in stored grain.

In practicing my invention, I treat the grain preferably as it comes from the field and before storage, and at a suitable point in its transmission to the storage silo or bin with about .05% to about .25% and even up to 1.0% by weight of very finely divided, dry, diatomaceous earth in such a manner as to cause it to adhere to the surface of the seed. By extensive tests I have determined that while this treatment is no more effective in killing eggs than fumigation and other known treatments, it has the effect of killing insects after they hatch. Instead of cooling the grain to prevent hatching, therefore, sufficient warming of the grain to hatch all of the eggs initially present will gradually free the stored grain from infestation so that the grain, unless reinfested, may be ground to flour or stock feed and the ground product will not become "maggoty" during ordinary storage.

I have found that grains are generally infested with almost all of the class Hexapoda of the phylum arthropods; and of the Hexapoda, the commonly found orders Coleoptera (beetles), Lepidoptera (moths), Hymenoptera (butterflies), and Diptera are also represented. All these insects appear to be killed by the finely divided diatomaceous earth. The kill time observed is determined by several factors, including the stage at which the insect comes in contact with the diatomaceous earth. Of the insects mentioned, some go through only one instar stage and some as many as ten. Some chrysalize directly and some go through a pupal stage. Generally speaking, the larvae will be killed within about one week after contact with the diatomaceous earth, and adults in forty-eight to ninety-six hours after exposure. During the instar stage when the insect chitin is vulnerable, twenty-four hours is the usual kill time. Experimental investigation has indicated that the diatomaceous earth particles kill the insect by contact and by ingestion; and since the larvae are closely confined in the area of the diatomaceous earth on the surface of the stored seed, death is a virtual certainty.

To determine the effect of finely divided diatomaceous earth, I prepared a fifty-pound container of previously stored ground sorghum grain of a type used for cattle feed and treated the batch with mixed insects from an infested grain storage silo. Leaving the container at room temperature, the ground sorghum grain was soon thoroughly infested throughout with a mixture of insects common to the Southwest in various stages of growth. Two pint containers of red milo were then prepared, the seeds in one container being untreated to serve as a control, and the seeds in the second container being treated with very finely ground diatomaceous earth in accordance with the teachings of the invention, using proportions of one part by weight of diatomaceous earth to two hundred parts of seed. In all instances, regardless of the type of infestation, the control sample became so badly infested as to be substantially unfit for use; and the sample treated with powdered diatomaceous earth but otherwise identical with the control suffered no further infestation, and added insects in various stages of their life cycles were killed within the times pointed out hereinabove. Similar experiments were repeated using up to one gallon of various seeds including lettuce and alfalfa seed, wheat, barley, various sorghum grains, beans, peas and other legumes with like results. Even several decorative type grains were successfully preserved in storage by this method.

I have found by such experiments that the proportion of diatomite required is a function of the fineness of its subdivision, the total grain surface, and the character thereof. Smaller grains require more diatomaceous earth because of their greater surface, and grains or seeds having hairs or rough surfaces such as the cleft found in some seeds require an increased amount of diatomaceous earth. Thus twenty pounds of specially prepared diatomite is adequate per ton of wheat and most legumes; twenty-five pounds of barley; fifteen to twenty-five pounds for sorghum grains; thirty pounds for alfalfa seed; and fifty pounds or more for lettuce seed.

As a still further test of the efficacy of the process I prepared an insectary of ground sorghum grain by infesting the same with the following organisms and maintaining the same at about 80° F.: *Oryzaephilus surinamensis* (C) (Cucujidae), *Rhizopertha dominica* (F) (Bostrychidae), Laemophloeus sp. (Cucujidae), palorus sp. (Tenebrionidae), *Trogoderma parabile* (Beal) (Dermestidae), and *Tribolium castaneum* (Herbst) (Tenebriodidae). In this list all are Coleoptera, the family in each instance being in parenthesis. The family Dermestidae includes some of the most destructive of the beetles. In all instances, results with these specifically identified insects were as already described; and complete control is obtainable.

In the class of Coleoptera there are species in which the larvae selectively attack the seed germ or bore into the seed— in fact, they will also bore through the shell of stone seeds such as peach and the like. Using the control method of my invention, there appears never to be any greater infestation than that represented by the insect eggs attached to the seeds on first storage. No further infestation develops, as by development of adults and the laying of additional eggs. When this type of organism is found to exist, therefore, ordinarily only one percent to a fraction of a percent of the seeds will be destroyed by the boring or germinating larvae when the process of my invention is used, as contrasted with sometimes almost total destruction using present methods.

I have already disclosed that the rate of subdivision of the diatomaceous earth determines in part the proportion required. For best results the diatomaceous earth should be as finely divided as possible. From a practical standpoint the cost of extremely fine grinding of all portions is not justified, because the product itself is relatively inexpensive and completely non-toxic and unobjectionable in the quantities required. For practical results, the diatomaceous earth is ground in a ball mill or other suitable device until at least about 90% is less than one micron in diameter. In this product approximately half of the diatomaceous earth particles are fine enough to be most effective. An effective method of treatment to assure the maximum proportion of the most effective finely divided diatomaceous earth is to combine preparation of crop dusting and grain protecting products in which known fine grinding methods are used. The air-borne fraction is delivered to a bag house for treatment by cyclonic collectors, the heavy fraction being used for crop dusting and the lighter air-borne fraction used for grain treatment in accordance with the present invention.

As the seed is advanced for storage in either a bin or storage silo it is treated with pulverulent diatomaceous earth in proportions of .05% up to about 1.00% of the weight of the grain. Depending on the particular installation at the storage site, the diatomaceous earth is preferably introduced by a small screw conveyor, by injection, by air blast or the like into the seed as it is being advanced by a distributing or elevating screw, belt, chute, pipe conveyor or the like. Movement of the seed and its falling into a storage area are enough to assure adequate coverage because of the fine state of subdivision of the treating agent.

Following the above method, in actual practice a ninety ton storage silo was left badly infested and without cleaning of any kind; ninety tons of red milo were screened and, while being transported by screw conveyor to the storage silo, were thoroughly intermixed with eighteen hundred pounds of powdered diatomaceous earth. After storage for one week there was no further sign of insect infestation, and after several weeks in which the seed was not cooled in any way, tests showed no sign of active insect life. These tests further indicated that gradually all insect eggs present in the grain during initial storage were hatched out and the larvae destroyed before reaching the adult stage.

When grain is harvested it contains a fairly large number of eggs for the most part adherent to the seed surface. Some of these eggs are automatically removed in the handling of the grain, but on storage many eggs remain. At the end of harvesting and at first storage there is relatively little and frequently no "hidden infestation," which is the expression commonly used to identify infestation within the body of the seed itself. By substantially completing coating the entire outer surface of the seeds at first storage with diatomaceous earth of the general type identified in my previous applications, and more specifically identified hereinbelow, hidden infestation may be substantially completely eliminated. When an insect egg is hatched, the emerging larva is minute, and it is moreover killed by the diatomaceous earth before it has an opportunity of boring its way into a seed. Because of this feature, grain treated with diatomaceous earth in accordance with the present invention on first storage developes no hidden infestation, and with care can be employed to produce a food product of substantially zero insect fragment content ("frag count").

Briefly the problems facing the millers is due to the fact that storage methods prior to the present invention resulted in considerable hidden infestation of grains such as wheat. If can insect gains access to the internal structure of the wheat it may pupate several times before emerging, and the skeleton resulting from each pupation introduces a possibility of frag count. Stored grain is commonly treated in a piece of equipment, of which the so-called Entolater is illustrative for cleaning up the grain, removing insects and insect fragments, and otherwise producing a clean grain product. The aspirator on this equipment can be set to remove individual grains which have been so hollowed out as to amount to a mere shell. The lightness of such grains makes them easily removable. Individual grains only recently infested cannot be so removed, because to do so it would require the aspiratory nozzles to be set so high that they remove a substantial part of the good wheat. There is, therefroe, no practical way of avoiding a relatively high frag count, even though government standards if rigorously enforced call for a frag count of zero or near zero for the best grade of flour.

In accordance with the present invention treating the grain at first storage with sufficient finely divided dust comprising a fraction of naturally occurring diatomaceous earth to coat the entire outside surface has the result of maintaining the grain in stored condition substantially indefinitely without further treatment and without the development of a substantial amount of hidden infestation caused by insect larvae boring into the endosperm of the wheat. A grain such as wheat so stored is first treated to remove the outer hull, and in this process the adherent diatomite will also be removed. The hull portion can be ground or otherwise prepared as an animal food supplement which will contain roughly about 1% of diatomite. This amount of diatomite improves the metabolism of the animal, eliminates most internal parasites, inhibits hatching of fly and other larvae in the feces, and has an improved effect in soil conditioning as the effluvia of the animal is returned to the soil.

Grains and seeds other than those employed in the production of flour are also benefited in the same way by the present invention, but frequently it is not necessary to remove the diatomite fraction before utilization of the grain for the production of a cereal product. The storage method of the present invention introduces no toxic substances such as may be introduced by storage and insect control media such as fumigants and insecticides.

An important feature of the present invention is the fact that a body of stored grain having its surface coated with a diatomite fraction in accordance with the present invention will not be infested appreciably or at all by insects in the storage area because of the marked repellency action of the diatomite. Tests have shown a repellency action as high as 99% and even higher.

When a storage area has been used for grain storage for a relatively long period of time in accordance with practices of the prior art, a relatively large number of insects in various stages of development from egg to mature insect may be found in cracks, crannies and crevices around the storage area. While normally the repellency action of a diatomite fraction used in accordance with my present invention will inhibit infestation activities by such insects, and a gradual cleaning up of the storage area, I prefer to treat such a storage area before first storage of new grain with a non-toxic insecticide type of material. To this end I may employ either the same diatomaceous earth fraction which will be used to coat the newly stored grain, or I may employ such a fraction on the surface of which has been previously absorbed a relatively small portion of a botanical insecticide. Illustratively such a finely divided diatomite fraction may carry up to approximately .01% pyrethrum or a botanical insecticide such as rotenone, sabadilla, ryania, or the like. Very good results are obtainable when approximately 0.025% pyrethrum extract containing the usual four homologues is used. A finely divided diatomite material substantially identical with that used on the grain, but including a relatively small proportion of a botanical insecticide will quickly dispose of many adult insects, and will remain available after the botanical insecticide has lost its potency to function as a straight diatomite fraction to repel, kill, and arrest the proliferation of remaining insectaria.

Once a storage area has been cleaned up all that is necessary is to store the product of the present invention therein. The condition of the storage area can be determined readily by the odor associated with it. A large elevator in which grain has been stored for a period of time in accordance with processes of the prior art has a continuous fetid offensive odor; but a storage area in which grain is stored in accordance with the present invention has a very pleasant odor, not unlike that of freshly baked bread when the temperature is relatively high.

One of the pronounced advantages of the process of the present invention is in its economy. When grain is stored in accordance with prior art methods, there is an average shrinkage due to insect infestation of about 1% per month. While this figure may vary from location to location and storage area to storage area, and may vary somewhat with different seeds, almost all investigators agree that there is an average loss or shrinkage of 1% per month. Using the process of the present invention there is practically no shrinkage due to insect loss when grain is taken directly from the field, first suitably conditioned and then treated in accordance with the present process on first storage before any substantial amount of hidden infestation shall have occurred. Preferably, of course, the grain is "conditioned" before storage, and this usually is thought to include screening, de-dusting and adjusting the moisture content to a desired amount, in the case of wheat commonly 10% to 12%. The diatomaceous earth fraction used may have from about 1% to about 10% of moisture, a very good proportion being from about 1½% to 3% for most seeds. Under these conditions there is very little moisture loss to the diatomaceous earth and, as stated, an extremely negligible to non-existent loss due to insect damage. A further advantage costwise is that normally only one application of a powdered diatomite fraction is required on grain during the entire storage period. Commonly the cost of applying dust in accordance with the process of the present invention will be approximately equivalent to one fumigation treatment. Should anything happen to cause removal of the diatomaceous earth dust from the surface, such as the development of a water leak in a storage building, then it will be necessary to reapply the dust to the grain from which it has been removed by leaking water. In actual experiments I have had this occur and have found that if not re-treated the grain may become infested, particularly if it is near the surface; but if additional treatment with diatomite dust is resorted to relatively soon, no appreciable damage will occur.

While it is preferred that seeds be treated in accordance with the present invention on first storage and before hidden infestation has been developed, advantages to be gained from the use of the present invention even if grain has already been subjected to poor storage conditions and has become infested both visibily and hidden, such grain will normally contain insects in various stages of growth, and in the case of insects normal to stored grain many may have reached an adult stage. This will mean that there has been substantial shrinkage of the grain, and if infestation is bad, there may have been more than 1% shrinkage per month. Such a grain may be treated in accordance with the present invention, and the grain gradually cleaned up and freed of further infestation. This will occur through killing all insects which have passed the final pupal stage, the killing of freshly hatched larvae, and the killing of all partially grown insects as they leave the individual grains. To accelerate bringing the grain under control, however, the diatomaceous earth fraction is preferably treated to incorporate a substantially non-toxic botanical insecticide as described hereinabove in connection with the dusting of storage areas. For example, .025% of pyrethrum added to the powdered diatomite fraction will relatively quickly kill or at least greatly supress the activity of adult insects, and the diatomaceous earth fraction as such will act in its own capacity to produce a killing action as well as a repellency action. It has been found that whenever partially infected grain is treated in accordance with the present invention there is a tendency for the insects to move to the very bottom of the storage area in an apparent effort to get away from the unattractive diatomaceous earth.

Since normally an insect within a seed will not readily be killed by the diatomaceous earth used in the manner described immediately hereinabove, the grain which is subjected to hidden infestation will usually be sufficiently consumed by the insect before it emerges and is killed by the diatomaceous earth, that most all of which seeds can be removed by aspiration along with skeletons of insects between the seeds before the grain is used, that flour produced from such grain and treated in accordance with the present invention normally will have a much lower frag count than infested grain treated in accordance with prior art procedures.

The diatomaceous earth fraction employed as described in my prior copending application may be a bag house product weighing as little as twelve or fourteen pounds (or in some instances even less) per cubic foot on a dry basis, and comprising substantially entirely silica ($SiO_2$) derived from diatoms. While this product is highly suitable for the purpose, particularly with certain types of seeds, a very effective range of dry density is eighteen to twenty-six pounds per cubic foot but more specifically between about twenty to twenty-four pounds per cubic foot. The diatomaceous earth fraction employed should be free of argillaceous material and should contain at least between 70% and 90% $SiO_2$ on a dry basis and optionally about 80% $SiO_2$ on a dry basis. The state of subdivision should be such that at least after 85% will pass through a 325 mesh screen. In actual tests it was found that if between about 9% and 13% or even 5% to 15% were retained on a 325 mesh screen very effective results were obtained. While this range may vary, because a larger amount of large particle size materials if present appear to do no material harm, but are without definite effect, for all practical purposes the more precise specification is preferred. Employing the mesh sizes pointed out, the smallest particle size is about 1/10 micron and the largest particle size about 40 microns. The surface area is between about 15,000 $cm.^2$/gram and 35,000 $cm.^2$/gram with the best results appearing to be obtained when a range of 20,000 to 30,000 $cm.^2$/gram are realized. When greater density material is employed it may be found that the proportion of silica derived from diatoms may be as low as 40% to 50% by weight but the number fragments may vary greatly from this apparent percentage as will be explained below.

In determining moisture it has been found that good results are obtainable using the Beckman Model KF–2 Aquameter, the use of which is described in Department of Agriculture bulletin No. 308.

The dry density is measured by first compacting the sample to remove air, and then the weight of the compacted sample calculated. For compaction a centrifuge is used and good results have been obtained by the use of Precision Scientific Company's catalogue #67341 operated for five minutes at 1,000 r.p.m. A suitable method is to weigh out five grams of the diatomite fraction to be tested and place it in a 50 cc. graduated conical-bottom centrifuge tube. The calculation is made in accordance with the formula $$312/\text{No. of cc.'s} = \text{lbs. per cubic foot}$$

The mesh size of the diatomaceous earth is determined in accordance with ASTM Method C–325–56, paragraph C. The dry material retained on the screen is determined in accordance with paragraph F, and this retained material is weighed to the nearest .01 gram when a 50 gram sample is used in starting. The percentage retained is determined by suitable factoring. If a 50 gram sample was used to start with, then the weight of the retained material in grams times two will give the percentage retained. If 100 grams should be used to start with, then the total weight of the retained portion would also comprise the percentage retained.

Surface area may be determined in any suitable conventional manner such as by the use of a Fisher Sub-Sieve Sizer No. 427, Calibrator No. 531, Catalogue No. 14, 312, Fisher Scientific Company.

Total silica content can be determined chemically. It is preferred, however, that at least about 50% by weight of the silica be derived from diatoms, and since the diatomaceous silica is relatively light as contrasted with crystalline silica derived from quartz, feldspar and the like, the amount of diatomaceous silica by volume will be much greater. By optically staining a sample with a 52% aqueous solution of potassium mercuric iodide (a straw colored solution) the diatomaceous silica appears blue in the field of the microscope, so that it is possible to count in a given field the number of particles of diatomaceous silica and the number of particles of crystalline silica. From data available with respect to weights, the proportion of diatomaceous silica by weight may be calculated.

The silica in the form of crystobalite should be removed, or if any is retained it should not be in any case greater than about 1%. Particles of crystobalite can be counted under a microscope if the test material is first treated with a material having a refractive index of 1.48. When the proportion of crystobalite has been established, and also the proportion of silica derived from diatoms, the remaining silica will normally be found to comprise quartz particles, with sometimes some smaller mixture of feldspar particles.

The preferred diatomaceous fraction employed in the present invention answers to the following specification:

| | |
|---|---|
| Moisture, percent | 1.5–3.0 |
| Dry density, lbs./cu. ft. | 20.0–24.0 |
| Mesh, percent retained on 325 | 9.0–13.0 |
| Particle size (in microns) | .1–40.0 |
| Silica ($SiO_2$), percent guaranteed | 80.0 |
| Crystobalite, percent | 1.0 |
| Surface area, cm.$^2$/gram | 20,000–30,000 |

The diatomaceous earth fraction produced in accordance with the present invention will vary somewhat from source deposit to source deposit, by an average qualitative spectrographic analysis which shows the following metals present in the percentages shown:

| | Percent |
|---|---|
| Silicon | 85.164 |
| Sodium | 5.000 |
| Aluminum | 3.900 |
| Iron | 2.000 |
| Titanium | 2.000 |
| Magnesium | 1.000 |
| Calcium | .840 |
| Boron | 0.060 |
| Copper | 0.010 |
| Zirconium | 0.010 |
| Strontium | 0.010 |
| Manganese | 0.002 |
| Vanadium | 0.002 |
| Gallium | 0.002 |
| | 100 |

The metals for the most part in the form of the oxides and, of course, there is some water crystallization. If it is assumed that the elements shown are present in the percentages given in the form of the oxides, and that the total percentage of moisture is 3% or 4%, then the resulting product would approximately comprise 100% of the diatomaceous earth fraction as actually employed.

Taking repeated random samples of a product having the above set out specification and subjecting it to microscopic analysis by first optically staining the particles, it is found that 85% to 90% of the particles observed under the microscope comprise silica derived from diatoms. In a very finely ground product there will be some particles the nature of which cannot be resolved, but of the particles which can be clearly identified in the field of the microscope 85% to 90% will have the typically blue color of diatomaceous silica.

The amount of diatomite fraction employed may vary, it being sufficient if the diatomaceous earth powder entirely covers the exterior surface of the seeds. A slight excess is not detrimental. Preferred percentages, however, with which good results appear to be obtained in all instances are as follows, the figure at the right indicating the number of pounds per ton employed in each instance:

| | Lbs. per ton |
|---|---|
| Wheat, beans, peas, soybeans | 6 |
| Rye, buckwheat, barley, oats | 8 |
| Sorghum, milo, rice | 8 |

Seed grains are frequently treated in accordance with prior art methods with the objective of permanently protecting them from insect damage. This is usually accomplished by coating the grain with a strong solution of a highly toxic insecticide. I found that when enough insecticide of toxic character is employed on the seed grain to prevent insect infestation, the grain is also adversely affected in that the percentage of seeds germinating will be markedly reduced. Germination tests were conducted on over thirty-five lots of stored grain treated in accordance with the present invention, utilizing various proportions of the finely divided diatomite fraction identified hereinabove. All germination tests were conducted in accordance with the rules for seed testing adopted by the Association of Official Seed Analysts. In no instance was there evidence of there being any injury whatever to the endosperm, and germination was in each instance at least as good percentagewise as the germination of the controls. In each instance, in accordance with usual practices, the grain selected for test had known germination ranges in the range of 90% to 100%, 80% to 90%, and below 80%.

As already pointed out the process of my present invention preferably is carried out on first storage of the seed or grain, that is to say the entire outer surface of the grain is coated with the powdered diatomite fraction before any hidden infestation has developed. The exact manner of bringing this about will depend somewhat on the location of the storage facilities with respect to the farm and threshing location. When flat storage is employed, or when a small individual silo is used, it is not uncommon to employ a screw conveyor and elevator. When such equipment is available, a suitable method is to introduce the diatomaceous earth substantially continuously, or in relatively small increments into the "boot" of the screw conveyor, which is the term commonly applied to the open unit in which the grain is introduced and from which it is picked up by the screw conveyor. The manner of introduction is to predetermine the rate of feeding of the grain, to calculate the powdered diatomite requirements, and then to apply such diatomite powder either continuously or in continuing small increments to match the grain feed and introduce the right proportion of each constituent. Normally as the grain and diatomaceous earth powder move along together through the action of the screw conveyor substantial mixing and coating action occurs, and when the grain is finally discharged there is such intermingling of grain and dust that all of the surfaces become covered. Another method is to pass cleaned and conditioned grain along a horizontal feed belt at a lower level and to apply the diatomaceous earth fraction in finely divided form to this feed belt whence it is normally raised in bucket elevators and delivered to a cross belt at an upper elevation for delivery to a storage silo. The mixing which occurs on the two belts, on the elevator and in the act of letting grain fall by gravity into the storage silo assures adequate mixing and coating of all surfaces.

EXAMPLE I

A hard white wheat known as Ramona was grown in Arizona, and the wheat threshed and trucked to a mill. 300 tons of such wheat was cleaned and conditioned to 12% of moisture as it was received from the field. The 300 tons of wheat was then gradually poured onto a horizontal belt and 1,800 pounds of a powdered diatomite fraction corresponding to the formula set out hereinabove was gradually introduced onto the belt so that it was disbursed along the entire 300 tones of wheat as it moved horizontally on the feed belt. The feed belt delivered the grain to bucket elevators which raised it to a cross belt on which it was discharged into the top of a round storage silo, so that the powdered diatomite fraction thoroughly coated substantially the entire outside surface of the wheat. The so coated bees ears or barbs on the wheat are caused to expand slightly by this treatment, a feature which literally enhances removal of the hull. The 300 tons of Ramona hard white wheat so processed was retained in storage for 18 months, with no other treatment during this entire period. The temperature of the wheat under test was effected by only ambient temperature in the immediate vicinity of Phoenix, Ariz., so that during the period of storage there were only two or three short periods during the night when the temperature was below freezing. Temperatures within the storage area were in general higher than ambient temperatures at all times, and the ambient temperature ranged from about 115° F. during the day during the summer months down to about 65° F. or 70° F. during the day during the winter months. There was no detectable time during this storage period when this temperature of the stored grain was below 50° F.

After 18 months of storage the grain remained clean and uninfested with insects. No evidence of hidden infestation was found. The so stored wheat was then subjected to a first rough grind and removal of the exterior hull, at which time the diatomaceous earth fraction was also removed. The wheat was ground into flour and several tests revealed either no frag count or a miximum of a frag count of one, as contrasted with a frag count of twenty or thirty for premium grades of flour found on the market. Tests also showed that the flour was entirely free of toxic residues when premium grades of flour were found having as high as 100 parts per million of poisonous residues, such flours having been produced from wheat grain stored in accordance with conventional practices prior to the present invention. The material removed in the first rough grind was diverted to animal feeding for use as a diet supplement, and it was found to have advantages in improved metabolism and other respects as already pointed out hereinabove.

An important aspect confirmed by this example is the fact that grain shrinkage during the 18 month storage period was practically zero whereas if such grain had been stored and maintained in accordance with conventional methods involving fumigation and the like, shrinkage at the temperatures of storage would have been in excess of 1% per month.

EXAMPLE II

In fested grain was removed from a storage silo and separated by means of aspirator type equipment into two fractions, one comprising principally uninfested grain and the other infested grain. The infested grain was bagged and stored in bags on the working floor of a grain elevator. Grain treated in accordance with the present invention was also bagged and such bags placed next to the bags of infested grain. After three months the freshly stored grain was examined and found to be in good condition. Apparently the pronounced repellent action of the diatomaceous earth fraction employed prevented insects from migrating to the good grain.

EXAMPLE III

Red milo was threshed in the Casa Grande area of Arizona and trucked to a flat storage building where it was introduced into the boot of a screw conveyor after cleaning, together with a diatomaceous earth fraction corresponding to the formula given hereinabove in proportion of 8 pounds of the diatomaceous earth to one ton of red milo seed. The screw conveyor elevated the red milo to an elevated spout which was adjustable to feed and distribute grain as it was piled up in flat storage. On examination the round red milo seeds were found to be substantially entirely covered with the very finely powdered diatomite material. The red milo was stored for about 2 months, and then feeding was initiated so that all of the red milo so stored was gradually used over a period of shortly in excess of a year. During this entire time the red milo remained completely free of infestation so far as all usual methods of observation showed. There was substantially no loss in weight during this period, except for a slight loss which occurred due to moisture reduction.

The invention has been disclosed in detail so that those skilled in the art may understand the manner of practicing the same, but the scope of the invention is identified by the claims.

I claim:
1. The method of freeing seeds from insect eggs and preventing further hidden infestation thereof, which includes the steps of:
   adjusting the moisture content of the seeds to no more than about 12 percent, by weight;
   coating substantially the entire outer surfaces of the seeds with diatomaceous earth having a particle size less than about 40 microns;
   storing the seeds at a temperature above that required to hatch insect eggs, for a period of time to hatch all of the insect eggs in the seeds; and
   maintaining the seeds in the aforementioned coated condition.

2. The method of freeing seeds from insect eggs and preventing further hidden infestation thereof, which includes the steps of:
   adjusting the moisture content of the seeds to no more than about 12 percent, by weight;
   coating substantially the entire outer surfaces of the seeds with a composition consisting essentially of diatomaceous earth having a diatomite fraction present in an amount sufficient to kill adult insects which may be present on the surfaces of the seeds and to kill larvae which hatch from insect eggs which may be present on the surfaces of the seeds, said diatomaceous earth having a moisture content less than about 10 percent and a particle size less than about 40 microns;
   storing the seeds at a temperature above that required to hatch insect eggs, for a period of time to hatch all of the insect eggs in the seeds; and
   maintaining the seeds in the aforementioned coated condition during storage.

3. The method of freeing seeds from insect eggs and preventing further hidden infestation thereof, which includes the steps of:
   adjusting the moisture content of the seeds to no more than about 12 percent, by weight;
   coating substantially the entire outer surfaces of the seeds with a diatomaceous earth composition substantially free of argillaceous material and having the following characteristics
      (a) moisture, less than about 10 percent
      (b) particles size, less than about 40 microns
      (c) silica content, at least 70 percent with no less than about 50 percent thereof derived from diatoms;
   storing the seeds at a temperature above that required to hatch insect eggs, for a period of time to hatch all of the insect eggs in the seeds; and
   maintaining the seeds in the aforementioned coated condition during storage.

4. The method of freeing seeds from insect eggs and preventing further hidden infestation thereof, which includes the steps of:
   adjusting the moisture content of the seeds to no more than about 12 percent, by weight;
   coating substantially the entire outer surfaces of the seeds with a diatomaceous earth composition substantially free of argillaceous material and having the following characteristics
      (a) moisture, less than about 10 percent
      (b) particle size, between about 0.1 micron and 40 microns
      (c) silica content, between about 70 to about 90 percent, on a dry basis, with no less than about 50 percent thereof derived from diatoms
      (d) silica in the form of crystobalite, not more than 1 percent;
   storing the seeds at a temperature above that required to hatch insect eggs, for a period of time to hatch all of the insect eggs in the seeds; and maintaining the seeds in the aforementioned coated condition during storage.

5. The method of producing flour from grain which is non-toxic and substantially free of insect fragments and insect eggs, which includes the steps of:
  adjusting the moisture content of the grain to no more than about 12 percent, by weight;
  coating substantially the entire surfaces of the grain with a composition consisting essentially of diatomaceous earth having a diatomite fraction present in an amount sufficient to kill adult insects which may be present on the surfaces of the grain and to kill larvae which hatch from insect eggs which may be present on the surfaces of the grain, said diatomaceous earth having a moisture content less than about 10 percent and a particle size less than about 40 microns;
  storing the grain at a temperature above that required to hatch insect eggs, for a period of time sufficient to hatch all of the insect eggs in the grain;
  maintaining the grain in the aforementioned coated condition during storage;
  removing any hollowed grains and insect skeletons from amongst the grains;
  removing the outer hulls and the coatings from the grain prior to the milling thereof; and
  processing the remaining grain product to produce flour.

6. The method of producing flour from grain which is non-toxic and substantially free of insect fragments and insect eggs, which includes the steps of:
  adjusting the moisture content of the grain to no more than about 12 percent, by weight;
  coating substantially the entire surfaces of the grain with a finely divided diatomaceous earth composition substantially free of argillaceous material and having the following characteristics:
    (a) moisture, less than about 10 percent
    (b) particle size, between about 0.1 micron and 40 microns
    (c) silica content, between about 70 percent to about 90 percent on a dry basis, with no less than about 50 percent thereof derived from diatoms
    (d) silica in the form of crystobalite, not more than about 1 percent
    ((e) surface area, from about 15,000 to about 35,000 square centimeters per gram;
  storing the grain at a temperature above that required to hatch insect eggs, for a period of time sufficient to hatch all of the insect eggs in the grain;
  maintaining the grain in the aforementioned coated condition during storage;
  removing any hollowed grains and any insect skeletons from amongst the grains;
  removing the outer hulls and the coatings from the grain prior to the milling thereof; and
  processing the remaining grain product to produce flour.

7. The method of storing grain prior to milling to obtain a flour which is non-toxic and substantially free of insect fragments, which includes the steps of:
  taking the grain from the field and prior to first bulk storage and adjusting the moisture content thereof to no more than about 12 percent, by weight;
  coating the outer surfaces of the grain with a relatively dry, finely divided dust consisting essentially of diatomaceous earth having sufficient diatomite fraction present to kill adult insects which may be present on the grain and to kill insect larvae which hatch from insect eggs which may be present on the grain, said dust having a moisture content less than about 10 percent and a particle size less than about 40 microns;
  storing the grain in bulk at a temperature above that required to hatch insect eggs which may be present on the grain, for a period of time to hatch all of the insect eggs on the grain;
  maintaining the grain in the aforementioned dust-coated condition until immediately prior to the milling; and
  processing the remaining grain product to produce flour.

8. The method of producing flour from grain which is non-toxic and substantially free of insect fragments and insect eggs, which includes the steps of:
  adujusting the moisture content of the grain to no more than about 12 percent, by weight;
  coating substantially the entire surfaces of the grain with a finely divided diatomaceous earth composition substantially free of argillaceous material and having the following characteristics:
    (a) moisture, less than about 10 percent
    (b) particle size, between about 0.1 micron and 40 microns
    (c) silica content, between about 70 percent to about 90 percent on a dry basis, with no less than about 50 percent thereof derived from diatoms
    (d) silica in the form of crystobalite, not more than about 1 percent
    (e) surface area, from about 15,000 to about 35,000 square centimeters per gram;
  maintaining the grain in the aforementioned coated condition during storage;
  removing any hollowed grains and any insect skeletons from amongst the grains;
  removing the outer hulls and the coatings from the grain prior to the milling thereof; and
  processing the remaining grain product to produce flour.

References Cited

UNITED STATES PATENTS 2,930,699   6/1960   DeSollano et al. _____ 99—93

OTHER REFERENCES

LePelley et al., "Experiments in the Use of Insecticides for the Protection of Grain in Storage," published June 1954 in Bulletin of Entomological Research, vol. 45, pp. 295–311.

DeOng., The Chemistry and Uses of Insecticides, N.Y., Reinhold Publishing Corp., 1948, p. 313.

United States Dept. of Agr. Bulletin AMS–64, article entitled "Protecting Stored Seed From Insect Attack," 1955, pp. 1–15, pages 6, 7, 9, 12, 14 and 15 only being relied upon.

RAYMOND N. JONES, Primary Examiner

U.S. Cl. X.R.

99—153